(12) United States Patent
Ma

(10) Patent No.: US 8,102,272 B2
(45) Date of Patent: Jan. 24, 2012

(54) SIGNAL INSPECTION SYSTEM FOR ROTATION CONTROL DEVICE AND METHOD THEREOF

(75) Inventor: Li-Yan Ma, Shanghai (CN)

(73) Assignee: Inventec Appliances Corp. (TW)

( * ) Notice: Subject to any disclaimer, the term of this patent is extended or adjusted under 35 U.S.C. 154(b) by 565 days.

(21) Appl. No.: 12/400,624

(22) Filed: Mar. 9, 2009

(65) Prior Publication Data

US 2009/0224911 A1 Sep. 10, 2009

(30) Foreign Application Priority Data

Mar. 7, 2008 (TW) .............................. 97108194 A

(51) Int. Cl.
*G08B 21/00* (2006.01)
(52) U.S. Cl. .................................. 340/686.3; 340/686.1
(58) Field of Classification Search ............... 340/686.1, 340/686.6
See application file for complete search history.

(56) References Cited

U.S. PATENT DOCUMENTS 5,289,448 A * 2/1994 Sato ............................ 386/202
6,034,615 A * 3/2000 Srygley et al. ........... 340/870.31

* cited by examiner

*Primary Examiner* — Travis Hunnings
(74) *Attorney, Agent, or Firm* — Thomas W. Tolpin; Tolpin & Partners, PC

(57) ABSTRACT

A signal inspection system for a rotation control device and a method thereof are disclosed. The signal inspection system comprises a signal capturing device, a determining module, a signal transforming device, and a processing module. A first signal and a second signal outputted by the rotation control device are captured by the signal capturing device, and the state of the first signal is determined by the determining module. Based on the state of the first signal, the machine language transformed from the first signal and the second signal are assembled by the processing module by use of a preset mode, and the assembled result is deciphered by the processing module for outputting a rotational direction of the rotation control device. Therefore, the accuracy of inspection result may be effectively improved up to one hundred percent.

14 Claims, 4 Drawing Sheets

| rotational direction | signal | output waveform |
|---|---|---|
| clockwise direction | first signal | ON / OFF |
| | second signal | ON / OFF |
| counterclockwise direction | first signal | ON / OFF |
| | second signal | ON / OFF |

FIG.3

SIGNAL INSPECTION SYSTEM FOR ROTATION CONTROL DEVICE AND METHOD THEREOF

BACKGROUND OF THE INVENTION (a) Field of the Invention

The present invention relates to a signal inspection system for a rotation control device and a method thereof, and more particularly to a signal inspection technique that transforms signals into a machine language and then deciphers the signals.

(b) Description of the Prior Art

It is known that an electronic device has a key group for controlling direction keys. When the key group is in use, it enables a user to switch various functions or select options on the window of the electronic device and thereby permits the user to operate various functions on the window of the electronic device with ease.

The above-mentioned key group consists of four direction keys (up, down, left, and right). After the up, down, left, or right direction key is pressed, the cursor can be controlled to move in the up, down, left, or right direction, meanwhile, which permits a user to see that the cursor is switched from a previous item to a next item on the display so that the user can switch various functions. After the user has selected an option and presses a confirmation key to perform the confirmation action, the function selection has been made. While these four direction keys can permit a user to switch various functions or select options on the display, such operation causes the user great inconvenience and further increases the operational complexity. This often makes it difficult to control the action of the options on the window.

Therefore, some researchers further proposed a switch structure having a three-way operation knob which is rotated or pressed by a user to permit the user to switch various function options on the window.

When a program is used for inspecting such three-way operation knob, the outputs of two signals A, B are generally used for deciding whether the three-way operation knob is rotated in a clockwise direction or in a counterclockwise direction. The decision is based on the output waveforms of the two signals A, B. In general, it is first decided that signal A is at a logical high level, and then it is decided whether the level of signal B is rising or falling. If the level of signal B is rising, it is decided that the three-way operation knob is rotated in a clockwise direction; if the level of signal B is falling, it is decided that the three-way operation knob is rotated in a counterclockwise direction. However, the crosstalk may be induced by the changes in signal edges (rising and falling edges) to a very great extent under the condition that the changes in signal edges are used for making the decision. The more rapidly signal edges change, the greater the crosstalk may be induced. For example, when the decision is continuously made during rising and falling, the response time might be insufficient. Consequently, it has been found that the crosstalk easily leads to faulty decisions during executing an inspection program such leading to poor accuracy of the inspection result.

As a result of a variety of extensive and intensive studies and discussions to improve the influence of faulty decisions due to changes in signal edges on the inspection result as addressed above, the inventors herein propose a signal inspection system for a rotation control device and a method thereof based on their research for many years and plenty of practical experience, thereby accomplishing the foregoing expectations.

SUMMARY OF THE INVENTION

In view of the above problems, an objective of the present invention is to provide a signal inspection system for a rotation control device and a method thereof, particularly relating to a signal inspection technique that transforms signals into a machine language and then makes decisions on the signals so as to improve the accuracy of the inspection result.

Accordingly, to achieve the above objective, a signal inspection system for a rotation control device of the present invention at least comprises a signal capturing device, a filtering module, a signal transforming device, and a processing module. A first signal and a second signal outputted by the rotation control device are captured by the signal capturing device, and the state of the first signal is determined by the filtering module. The signal transforming device is used for transforming the first signal and the second signal into a machine language. Based on the state of the first signal, the machine language transformed from the first signal and the second signal are assembled by the processing module by use of a preset mode, and the assembled result is deciphered by the processing module for outputting a rotational direction of the rotation control device. In the signal inspection system, the determined state of the first signal is preset as a preset state.

Moreover, to achieve the above objective, the present invention provides a signal inspection method corresponding to the rotation control device of the present invention. The method comprises the steps of:

a. capturing a first signal and a second signal from the rotation control device;

b. deciding that the state of the first signal;

c. transforming the first signal and the second signal into a machine language;

d. assembling the machine language transformed through a preset mode based on the preset state of the first signal; and e. deciphering an assembled result of the machine language to output a rotational direction of the rotation control device.

As described above and according to a signal inspection system for a rotation control device and a method thereof of the present invention, in general, the phase difference between the first and second signals is at least ¼ cycle and the preset state of the first signal is a state in which the first signal is at a logical high level. The machine language is generally "0" or "1". Furthermore, a first assembled result of the machine language in the preset mode is the first signal after it is decided by the determining module and the second signal that is present at the same time; a second assembled result is the second signal after it has been changed and the first signal that is present at the same time so as to be able to give an assembled result of the machine language of "0" and "1" consisting of the first signal and the second signal. The output rotational direction of the rotation control device is counterclockwise when the machine language of the first assembled result is "10" and the machine language of the second assembled result is "11"; the output rotational direction of the rotation control device is clockwise when the machine language of the first assembled result is "11" and the machine language of the second assembled result is "10". By means of the signal transformation mode, a machine language is used for deciding a rotational direction of a three-way operation knob to effectively solve the prior art problem of faulty decisions caused by the crosstalk due to changes in signal edges (rising and falling edges) such that the accuracy of the inspection result is improved up to one hundred percent.

In order that the technical features and effects of the present invention may be further understood and appreciated, the preferred embodiments are described below in detail with reference to the related drawings.

BRIEF DESCRIPTION OF THE DRAWINGS

The foregoing objects, features and advantages of the invention will become more apparent from the following detailed description when taken in conjunction with the accompanying related drawings according to exemplary preferred embodiments of a signal inspection system for a rotation control device and a method thereof of the present invention. In the drawings, same elements are designated with same reference numerals.

FIG. 3 shows a schematic view of preferred embodiments of output waveforms of a first signal and a second signal according to the present invention.

DETAILED DESCRIPTION OF THE INVENTION

The following is a detailed description and explanation of the preferred embodiments and best modes contemplated by the inventors of carrying the invention along with some examples thereof.

Figure 1:
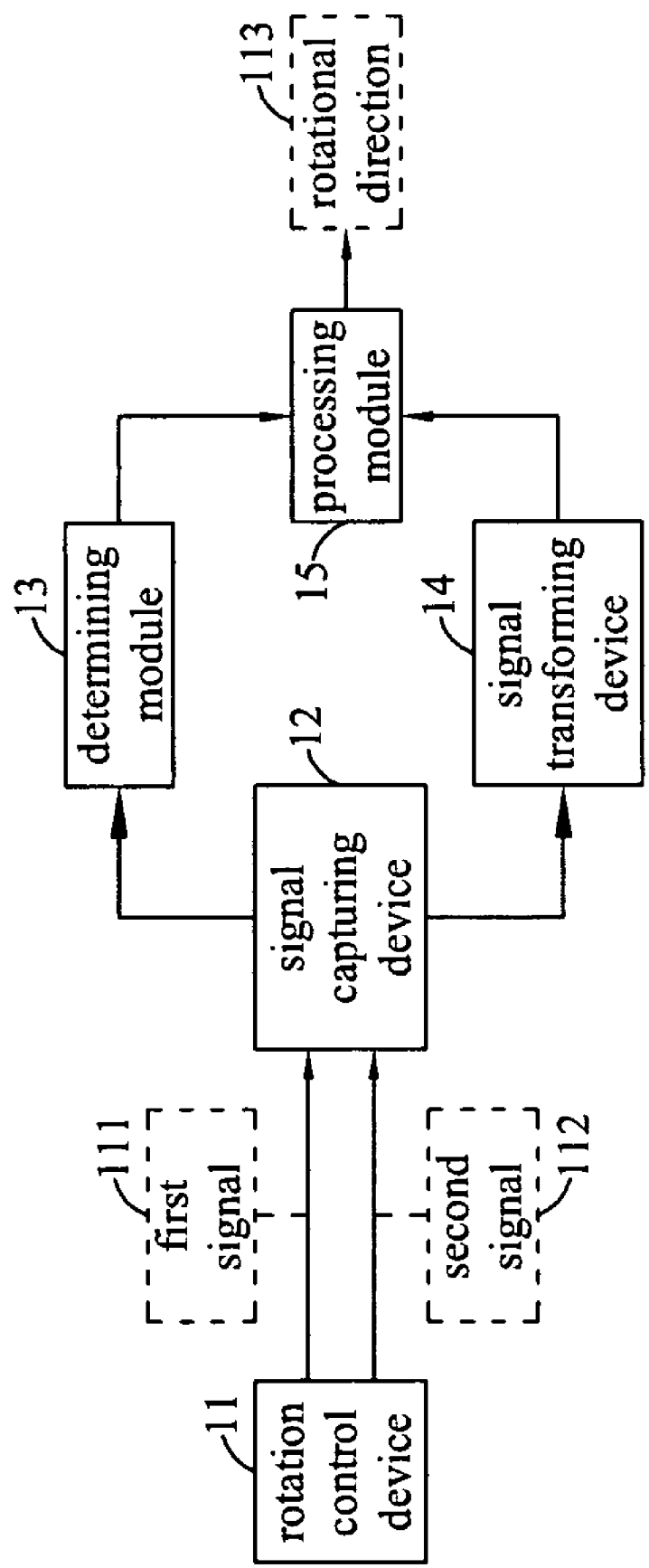
FIG. 1 shows a schematic view of a signal inspection system for a rotation control device according to the present invention.

Referring to FIG. 1, there is shown a schematic view of a signal inspection system for a rotation control device according to the present invention. The rotation control device is rotatable to control a function on an electronic device (not shown in FIG. 1). In an embodiment for example, the rotation control device comprises a three way operation knob used as an input interface of an electronic device, which can be rotated by the user so as to control the electronic device by navigating through various function options displayed on a screen of the electronic device. The control process may be further completed by selecting one of the function options while navigating through them. In this figure, the signal inspection system 1 for a rotation control device at least comprises a rotation control device 11, a signal capturing device 12, a determining module 13, a signal transforming device 14, and a processing module 15. A first signal 111 and a second signal 112 outputted by the rotation control device 11 are captured by the signal capturing device 12, and the state of the first signal 111 is determined by the determining module 13. In an embodiment, the determining module 13 is used to filter the first signal 111 in order to determine the state of the first signal 111. The signal transforming device 14 is used for transforming the first signal 111 and the second signal 112 into a machine language. Based on the state of the first signal 111, the machine language transformed from the first signal 111 and the second signal 112 are assembled by the processing module 15 trough a preset mode based on the determined state of the first signal 111, and the assembled result is deciphered by the processing module 15 for outputting a rotational direction 113 of the rotation control device 11.

In the above signal inspection system 1 for a rotation control device, the phase difference between the first signal 111 and the second signal 112 is in general at least ¼ cycle of the first signal 111 or the second signal 112. In the signal inspection system 1, the state of the first signal 111 is preset as a preset state, and the preset state of the first signal 111 is a logical high level which is determined by the determining module 13. The machine language comprises a logical level, generally corresponding to "0" or "1".

Furthermore, the assembled result comprises a first assembled result and a second assembled result. The first assembled result is based on the determined state of the first signal 111 and a first state of the second signal 112 concurrent with the determined state of the first signal 111. The second assembled result is based on a different state of the second signal 112 following the first state of the second signal 112 and another state of the first signal 111 concurrent with the different state of the second signal 112, so as to be able to give an assembled result of the machine language of "0" and "1" consisting of the first signal 111 and the second signal 112. In other words, the output rotational direction 113 of the rotation control device 11 is clockwise when the machine language of the first assembled result is "10" and the machine language of the second assembled result is "11"; the output rotational direction 113 of the rotation control device 11 is counterclockwise when the machine language of the first assembled result is "11" and the machine language of the second assembled result is "10".

Figure 2:
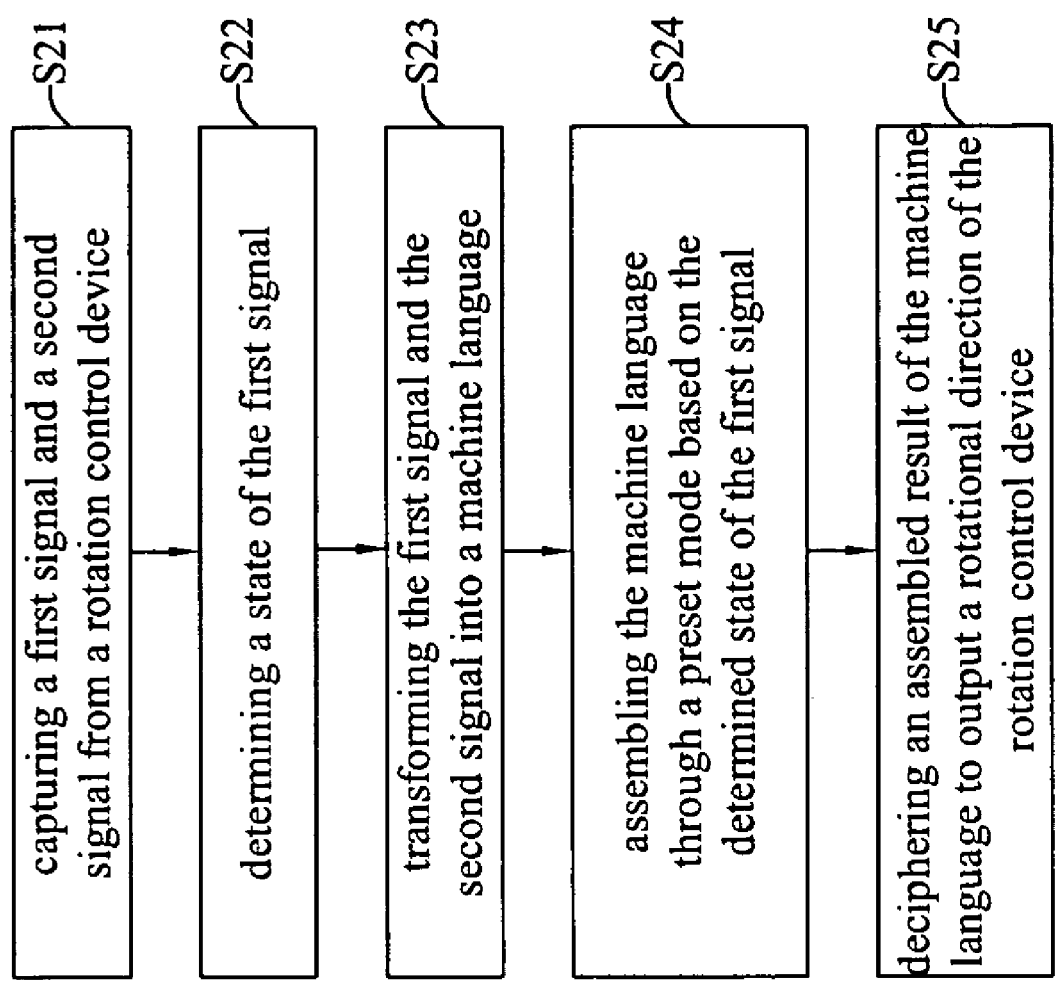
FIG. 2 shows a flow chart of a signal inspection method for a rotation control device according to the present invention.

Referring to FIG. 2, there is shown a flow chart of a signal inspection method for a rotation control device according to the present invention. The steps of the signal inspection method are as below:

Step 21: capturing a first signal and a second signal from a rotation control device;

Step 22: determining a state of the first signal is a preset state;

Step 23: transforming the first signal and the second signal into a machine language;

Step 24: assembling the machine language through a preset mode based on the determined preset state of the first signal; and Step 25: deciphering an assembled result of the machine language to output a rotational direction of the rotation control device.

In the above signal inspection method for a rotation control device, the rotation control device is rotatable to control a function on an electronic device. In an embodiment for example, the rotation control device comprises a three way operation knob controlling the electronic device by navigating through a screen. The control process may be further completed by selecting one of the function options while navigating through them. The phase difference between the first and second signals is in general at least ¼ cycle. The preset state of the first signal is a logical high level which is determined by the determining module. In an embodiment, the determining module is used to filter the first signal in order to determine the state of the first signal. The machine language comprises a logical level, generally corresponding to "0" or "1". The assembled result comprises a first assembled result and a second assembled result. The first assembled result is based on the determined state of the first signal and a first state of the second signal concurrent with the determined state of the first signal. The second assembled result is based on a different state of the second signal following the first state of the second signal and another state of the first signal concurrent with the different state of the second signal, so as to be able to give an assembled result of the machine language of "0" and "1" consisting of the first signal and the second signal. The output rotational direction of the rotation control device is clockwise if the machine language of the first assembled result is "10" and the machine language of the second assembled result is "11"; the output rotational direction of the rotation control device is counterclockwise if the machine language of the first assembled result is "11" and the machine language of the second assembled result is "10".

Referring to FIG. 3, there is shown a schematic view of preferred embodiments of output waveforms of a first signal and a second signal according to the present invention. In this figure, when the three-way operation knob is rotated in a clockwise direction, the output waveform of the first signal is ¼ cycle behind the output waveform of the second signal; when the three-way operation knob is rotated in a counterclockwise direction, the output waveform of the first signal is of ¼ cycle ahead of the output waveform of the second signal.

Figure 4:
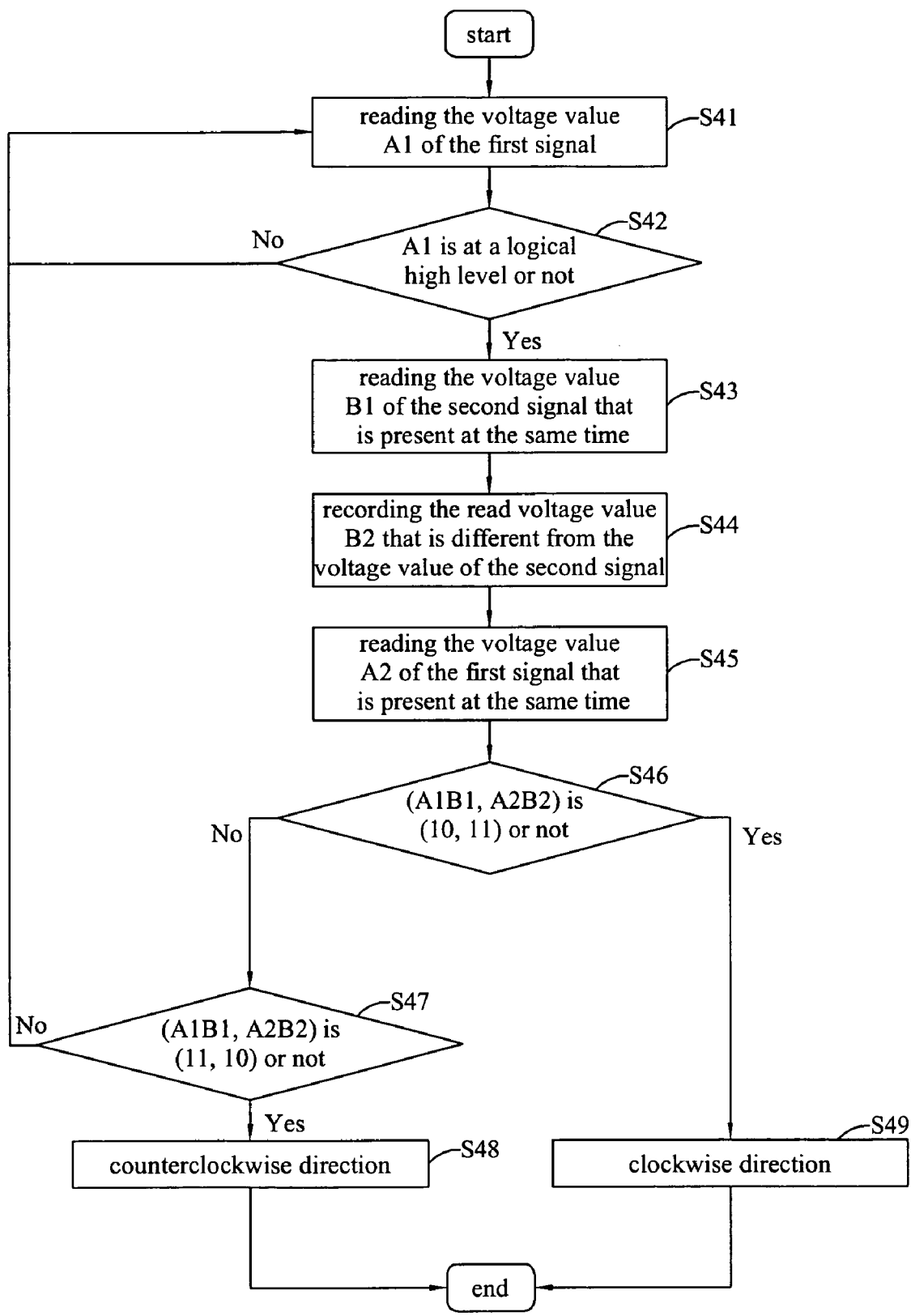
FIG. 4 shows a flow chart of a preferred embodiment of a signal inspection method for a rotation control device according to the present invention.

Referring to FIG. 4, there is shown a flow chart of a preferred embodiment of a signal inspection method for a rotation control device according to the present invention. In this figure, the preferred embodiment of the signal inspection method goes through the steps from "start" as below:

Step 41: reading the voltage value (A1) of the first signal;
Step 42: determining whether A1 is at a logical high level or not; if yes, conducting step 43; if no, returning to step 41;
Step 43: reading the voltage value (B1) of the second signal that is present at the same time;
Step 44: recording the read voltage value (B2) that is different from the voltage value (B1) of the second signal;
Step 45: reading the voltage value (A2) of the first signal that is present at the same time;
Step 46: determining whether the machine language of (A1B1, A2B2) is (10, 11) or not; if yes, conducting step 49; if no, conducting step 47;
Step 47: determining whether the machine language of (A1B1, A2B2) is (11, 10) or not; if yes, conducting step 48; if no, conducting step 41;
Step 48: outputting a counterclockwise direction of rotation of the three-way operation knob and ending the procedure; and
Step 49: outputting a clockwise direction of rotation of the three-way operation knob and ending the procedure.

The invalid results where (A1B1, A2B2) becomes (10, 01) and (11, 00) are excluded in two steps of step 46 and step 47.

As described above, by means of the signal transformation mode, a machine language is used for deciding a rotational direction of a three-way operation knob to effectively solve the prior art problem of faulty decisions caused by the crosstalk due to changes in signal edges (rising and falling edges) such that the accuracy of the inspection result is improved up to one hundred percent.

Although embodiments and examples of the invention have been shown and described, it is to be understood that various modifications, substitutions, and rearrangements of equipment, devices, components, parts, and structural features, as well as other uses and methods of the invention, can be made by those skilled in the art without departing from the novel spirit and scope of the invention.

What is claimed is:

1. A signal inspection system for a rotation control device which outputs a first signal and a second signal, said rotation control device being rotatable to control a function on an electronic device, the signal inspection system comprising:
    a signal capturing device for capturing the first signal and the second signal;
    a determining module for determining a state of the first signal;
    a signal transforming device for transforming the first signal and the second signal into a machine language; and
    a processing module for assembling the machine language through a preset mode based on the determined state of the first signal, and deciphering an assembled result of the machine language to output a rotational direction of the rotation control device.

2. The signal inspection system as claimed in claim 1, wherein the first and second signals has a phase difference of at least ¼ cycle.

3. The signal inspection system as claimed in claim 1, wherein the determined state of the first signal is a preset state of being at a logical high level.

4. The signal inspection system as claimed in claim 1, wherein the assembled result comprises a first assembled result and a second assembled result produced through the preset mode, the first assembled result is based on the determined state of the first signal and a first state of the second signal concurrent with the determined state of the first signal, and the second assembled result is based on a different state of the second signal following the first state of the second signal and another state of the first signal concurrent with the different state of the second signal.

5. The signal inspection system as claimed in claim 4, wherein the machine language comprises a logic level corresponding to 0 or 1.

6. The signal inspection system as claimed in claim 5, wherein the output rotational direction of the rotation control device is counterclockwise if the first assembled result comprises 10 corresponding to logic levels of the first signal and the second signal respectively and the second assembled result comprises 11 also corresponding to the first signal and the second signal.

7. The signal inspection system as claimed in claim 5, wherein the output rotational direction of the rotation control device is clockwise if the first assembled result comprises 11 corresponding to logic levels of the first signal and the second signal respectively and the second assembled result comprises 10 also corresponding to the first signal and the second signal.

8. A signal inspection method for a rotation control device which outputs a first signal and a second signal, said rotation control device being rotatable to control a function on an electronic device, the signal inspection method comprising steps of:
    capturing the first signal and the second signal from the rotation control device;
    determining a state of the first signal;
    transforming the first signal and the second signal into a machine language;
    assembling the machine language through a preset mode based on the determined state of the first signal; and
    deciphering an assembled result of the machine language to output a rotational direction of the rotation control device.

9. The signal inspection method as claimed in claim 8, wherein the first and second signals has a phase difference of at least ¼ cycle.

10. The signal inspection method as claimed in claim 8, wherein the determined state of the first signal is a preset state of being at a logical high level.

11. The signal inspection method as claimed in claim 8, wherein the assembled result comprises a first assembled result and a second assembled result produced through the preset mode, the first assembled result is based on the determined state of the first signal and a first state of the second signal concurrent with the determined state of the first signal, and the second assembled result is based on a different state of the second signal following the first state of the second signal and another state of the first signal concurrent with the different state of the second signal.

12. The signal inspection method as claimed in claim 11, wherein the machine language comprises a logic level corresponding to 0 or 1.

13. The signal inspection method as claimed in claim 12, wherein the output rotational direction of the rotation control device is counterclockwise if the first assembled result comprises 10 corresponding to logic levels of the first signal and the second signal respectively and the second assembled result comprises 11 also corresponding to the first signal and the second signal.

14. The signal inspection method as claimed in claim 12, wherein the output rotational direction of the rotation control device is clockwise if the first assembled result comprises 11 corresponding to logic levels of the first signal and the second signal respectively and the second assembled result comprises 10 also corresponding to the first signal and the second signal.

* * * * *